(12) United States Patent
Limbrunner et al.

(10) Patent No.: US 7,032,557 B2
(45) Date of Patent: Apr. 25, 2006

(54) METHOD AND DEVICE FOR CONTROLLING AN INTERNAL COMBUSTION ENGINE

(75) Inventors: Hubert Limbrunner, Kirchroth (DE);
Frank Tettenborn, Obertraubling (DE);
Berthold Wolfram, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 159 days.

(21) Appl. No.: 10/758,819

(22) Filed: Jan. 16, 2004

(65) Prior Publication Data
US 2004/0168667 A1 Sep. 2, 2004

(30) Foreign Application Priority Data
Jan. 30, 2003 (DE) ............................ 103 03 701

(51) Int. Cl.
*F02M 35/10* (2006.01)
(52) U.S. Cl. ...................... 123/184.53; 123/184.56; 123/184.59
(58) Field of Classification Search ........... 123/184.53, 123/184.55, 184.56, 184.59
See application file for complete search history.

(56) References Cited

U.S. PATENT DOCUMENTS

| 5,832,894 | A  | * | 11/1998 | Espe et al. ................. | 123/336 |
| 6,016,780 | A  | * | 1/2000  | Fischer .................... | 123/184.26 |
| 6,279,528 | B1 | * | 8/2001  | Happenhofer et al. .. | 123/184.53 |
| 6,431,136 | B1 | * | 8/2002  | Pietrowski et al. .... | 123/184.59 |

* cited by examiner

*Primary Examiner*—Andrew M. Dolinar
*Assistant Examiner*—Johnny H. Hoang
(74) *Attorney, Agent, or Firm*—Baker Botts L.L.P.

(57) ABSTRACT

An internal combustion engine has an intake device (1), the intake pipes (5 to 8) for the intakes of cylinders of the internal combustion engine and actuators for adjusting the effective pipe lengths of the intake pipes (5 to 8) by closing or opening at least one opening of the intake pipes (5 to 8) up to a hollow body and at least one actuator for controlling the actuators. Within a first speed range whose upper limit is a first threshold value (N1), the actuators are moved into a closed position. For a speed (N), exceeding a first threshold value (N1) and being less than a second threshold value (N2), the actuators are moved into a leakage position. For a speed exceeding the second threshold value (N2), the actuators are moved into an open position.

27 Claims, 3 Drawing Sheets

METHOD AND DEVICE FOR CONTROLLING AN INTERNAL COMBUSTION ENGINE

CROSS REFERENCE TO RELATED APPLICATION

This application claims foreign priority of the German application DE 10303701.2 filed on Jan. 30, 2003.

TECHNICAL FIELD OF THE INVENTION

The invention relates to a method and a device for controlling an internal combustion engine with an intake device, the intake pipes for the intakes of cylinders of the internal combustion engine and actuators for adjusting the effective pipe lengths of the intake pipes by closing or opening at least one opening of the intake pipes through to a hollow body and at least one actuator for controlling the actuators.

BACKGROUND OF THE INVENTION

Such an intake device in an internal combustion engine is well-known from DE 197 17 347 C1. The actuators formed as switching flaps are swiveled as a function of the RPM N of the crankshaft of the internal combustion engine and/or a mass air flow and/or an intake pipe pressure either in an open position or in a closed position by means of the actuator. Therefore, two different effective lengths of the intake pipes are obtained as a function of the RPM of the internal combustion engine. The effective length of the intake pipes in each case conforms to the length on which the gas pillar in the intake pipe swivels. This is the entire length of the intake pipes if the switching flaps are swiveled in their closed position or only the section of the intake pipes from one intake of the cylinders up to the switching flaps if the switching flaps are in their open position.

SUMMARY OF THE INVENTION

The object of the invention is to create a method and a device that guarantees a very good torque curve of an internal combustion engine.

The object of the invention can be achieved by a method for controlling an internal combustion engine with an intake device, comprising intake pipes for intakes of cylinders of the internal combustion engine and first actuators for adjusting the effective pipe lengths of the intake pipes by closing or opening at least one opening of the intake pipes up to a hollow body and at least one second actuator for controlling the first actuators, comprising the steps of:

within a first speed range whose upper limit is a first threshold value, moving the first actuators into a closed position, for a speed, exceeding a first threshold value and being less than a second threshold value, moving the first actuators into a leakage position, and for a speed exceeding the second threshold value, moving the first actuators into an open position.

For speeds exceeding the first threshold value and being less than the second threshold value, the leakage position can depend on the speed. As the speed increases, the leakage may be increased. Movement of the first actuators into a leakage position may also depend on a load size of the internal combustion engine. For a speed less than a third threshold value that is less than the first threshold value, the opening can be opened. The third threshold value can be in the range from 900 to 1500 rpm. The first threshold value can be in the range from 2800 to 4000 rpm. The second threshold value can be in the range from 3400 to 4800 rpm.

The object can also be achieved by a method for controlling an internal combustion engine comprising the steps of: providing intake control means for controlling an effective pipe length of an intake pipe system by opening or closing at least one opening of the intake pipes up to a hollow body;

determining an engine speed;

within a first speed range whose upper limit is a first threshold value, closing the opening, for a speed, exceeding a first threshold value and being less than a second threshold value, controlling said opening to have a leakage, and for a speed exceeding the second threshold value, opening said opening.

For speeds exceeding the first threshold value and being less than the second threshold value, the leakage may depend on the speed. As the speed increases, the leakage can be increased. Movement of the first actuators into a leakage position may also depend on a load size of the internal combustion engine. For a speed less than a third threshold value that is less than the first threshold value, the opening can be opened. The third threshold value can be in the range from 900 to 1500 rpm. The first threshold value can be in the range from 2800 to 4000 rpm. The second threshold value can be in the range from 3400 to 4800 rpm.

The object can further be achieved by a device for controlling an internal combustion engine with an intake device, comprising intake pipes for intakes of cylinders of the internal combustion engine, first actuators for adjusting the effective pipe lengths of the intake pipes by closing or opening at least one opening of the intake pipes up to a hollow body, at least one second actuator for controlling the first actuators, first means that within a first speed range whose upper limit is a first threshold value, move the first actuators into a closed position, second means that for a speed, exceeding a first threshold value and being less than a second threshold value, move the first actuators into a leakage position, and third means that for a speed exceeding the second threshold value, move the first actuators into an open position.

The object can further be achieved by a device for controlling an internal combustion engine with an intake device, comprising intake pipes coupled with intakes of cylinders of the internal combustion engine, first actuators for adjusting the effective pipe lengths of the intake pipes by closing or opening at least one opening of the intake pipes up to a hollow body, at least one second actuator for controlling the first actuators, a control unit for controlling the second actuator, wherein within a first speed range whose upper limit is a first threshold value, the control unit controls the second actuator to move the first actuators into a closed position, for a speed, exceeding a first threshold value and being less than a second threshold value, the control unit controls the second actuator to move the first actuators into a leakage position, and for a speed exceeding the second threshold value, the control unit controls the second actuator to move the first actuators into an open position.

For speeds exceeding the first threshold value and being less than the second threshold value, the control unit may control the leakage position depending on the speed. The control unit may increase the leakage as the speed increases.

The control unit may control the movement of the first actuators into a leakage position depending on a load size of the internal combustion engine. For a speed less than a third threshold value that is less than the first threshold value, the control unit may control the first actuators to be moved into the open position. The third threshold value can be in the range from 900 to 1500 rpm. The first threshold value can be in the range from 2800 to 4000 rpm. The second threshold value can be in the range from 3400 to 4800 rpm. The second actuator can be an electric motor. The first actuators can be switching flaps.

The outstanding aspect of the invention is that, within a first RPM range of which the upper limit is a first threshold value, the actuators are moved into a closed position that, for a RPM that exceeds the first threshold value and being less than a second threshold value, the actuators are moved into a leakage position and that, for a RPM that exceeds the second threshold value, the actuators are moved into an open position. As a result, in the first RPM range long effective intake pipe lengths and in the RPM range that exceeds the second threshold value, short effective intake pipe lengths are guaranteed. In that way, the cylinders of the internal combustion engine can be charged very effectively in each case in these RPM ranges. In addition, in the RPM range that exceeds the first threshold value and is less than the second threshold value, charging the cylinder is considerably improved by the leakage position of the actuator.

BRIEF DESCRIPTION OF THE DRAWINGS

Exemplary embodiments of the invention are explained below on the basis of the schematic drawings. The drawings show.

DETAILED DESCRIPTION OF THE PREFERRED EMBODIMENTS

Elements of the same design and function are identified in all the figures with the same reference symbol.

Figure 1:
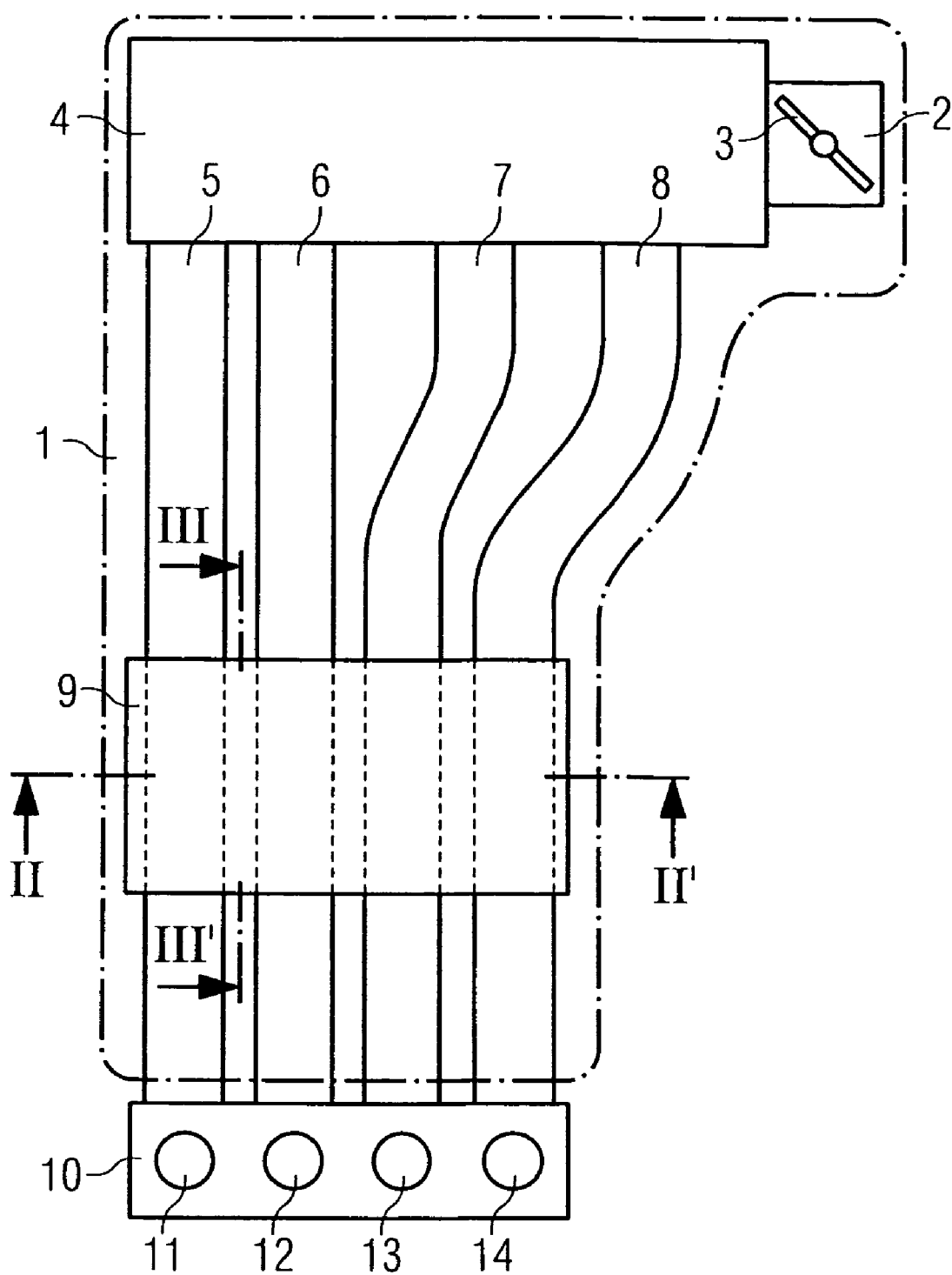
FIG. 1 an internal combustion engine with an intake tract 1.

An intake device 1 (FIG. 1) of an internal combustion engine has an intake air duct 2, in which a throttle valve 3 is preferably arranged. The intake air duct 2 communicates with a first manifold 4, from which intake pipes 5, 6, 7, 8 are again routed to intakes 11, 12, 13, 14 of an engine block. A second manifold 9 is embodied downstream of the first manifold 4 and upstream of the intakes 11 to 14. In the range of the second manifold 9, actuators embodied for closing or opening at least one opening of the intake pipes up to a hollow body are embodied as switching flaps 20, 21, 22. Thus, in this embodiment the hollow body is the volume up to the neighboring intake pipe 5 to 8 in each case. However, in an alternative embodiment, it can also be an additional volume. However, the hollow body can also directly be the first manifold 4 or communicate directly with the first manifold 4, for example, via a short piece of pipe socket.

In addition, an actuator 18 is provided that is embodied in such a way that it is suitable to move the switching flaps into an open position, in a closed position and in at least one leakage position. The actuator is preferably embodied as the electric motor. A device 19 for controlling the internal combustion engine is also provided that generates adjusting signals for the actuator 18 as a function of the operating parameters of the internal combustion engine such as a speed N of a crankshaft of the internal combustion engine.

Figure 2:
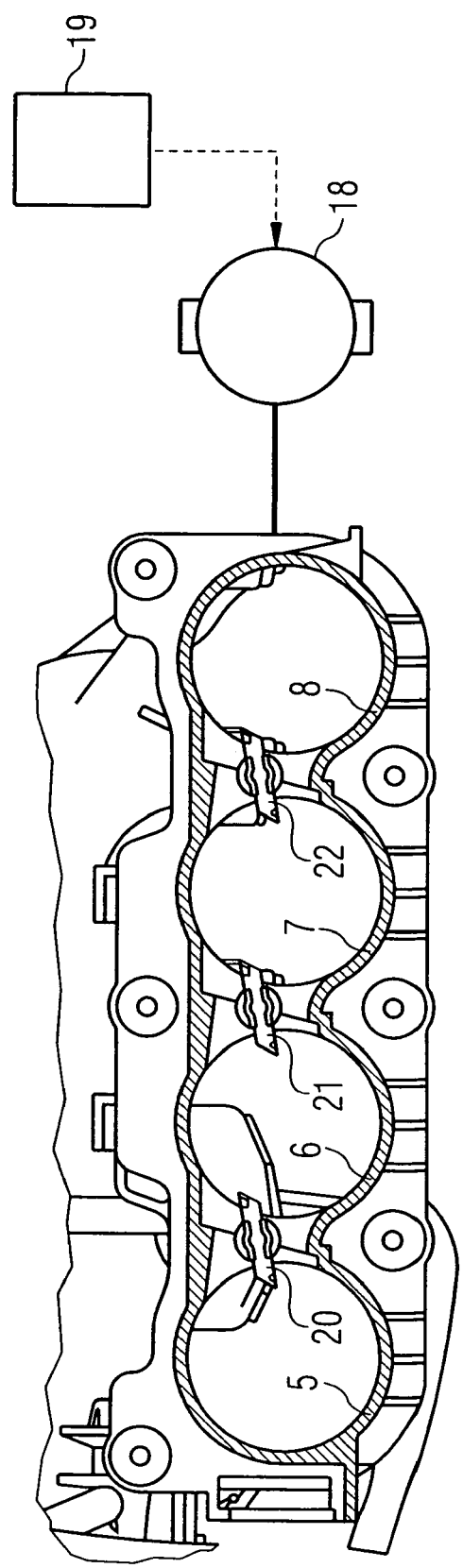
FIG. 2 a section of the intake device according to FIG. 1 along the line II–II', FIG. 3 a switching flap that is arranged in the intake device 1 and FIG. 4 a flowchart of a program for controlling the internal combustion engine.
Figure 3:
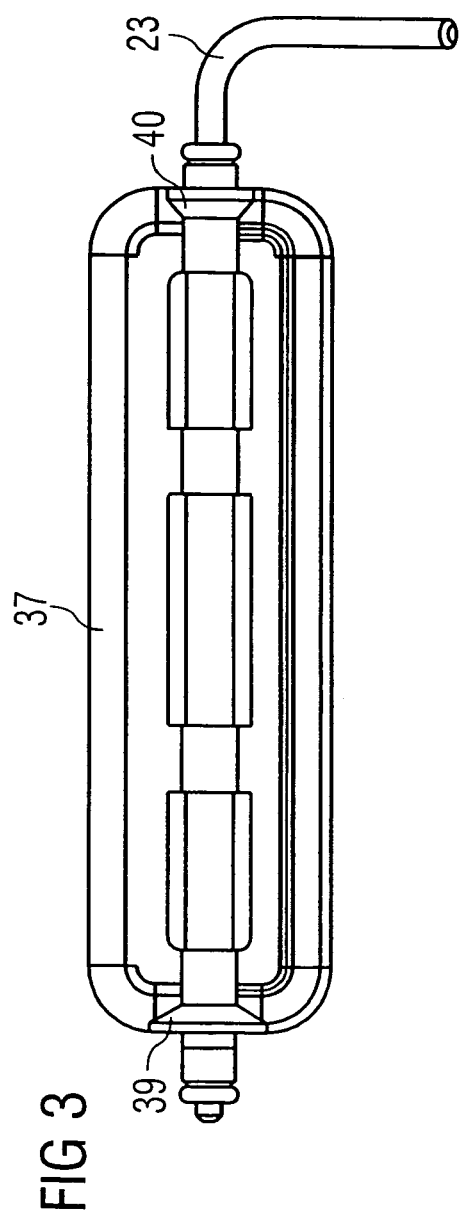

FIG. 3 shows a possible embodiment of the switching flap according to the FIG. 2. The switching flap 20 has a shaft 23 that is bent at right angles at a free end. The shaft 23 forms a close fit with an airfoil. A sealing compound is molded around the airfoil and embodied in such a way that it forms a sealing edge 37 on the edge side of the switching flap that comes to a stop in the closed position with a flange of the opening and the opening is then tightly closed. The sealing compound also forms a first and a second sealing cap 39, 40 that are arranged concentrically to the shaft 23 on the opposite axial ends of the switching flap 20.

Figure 4:
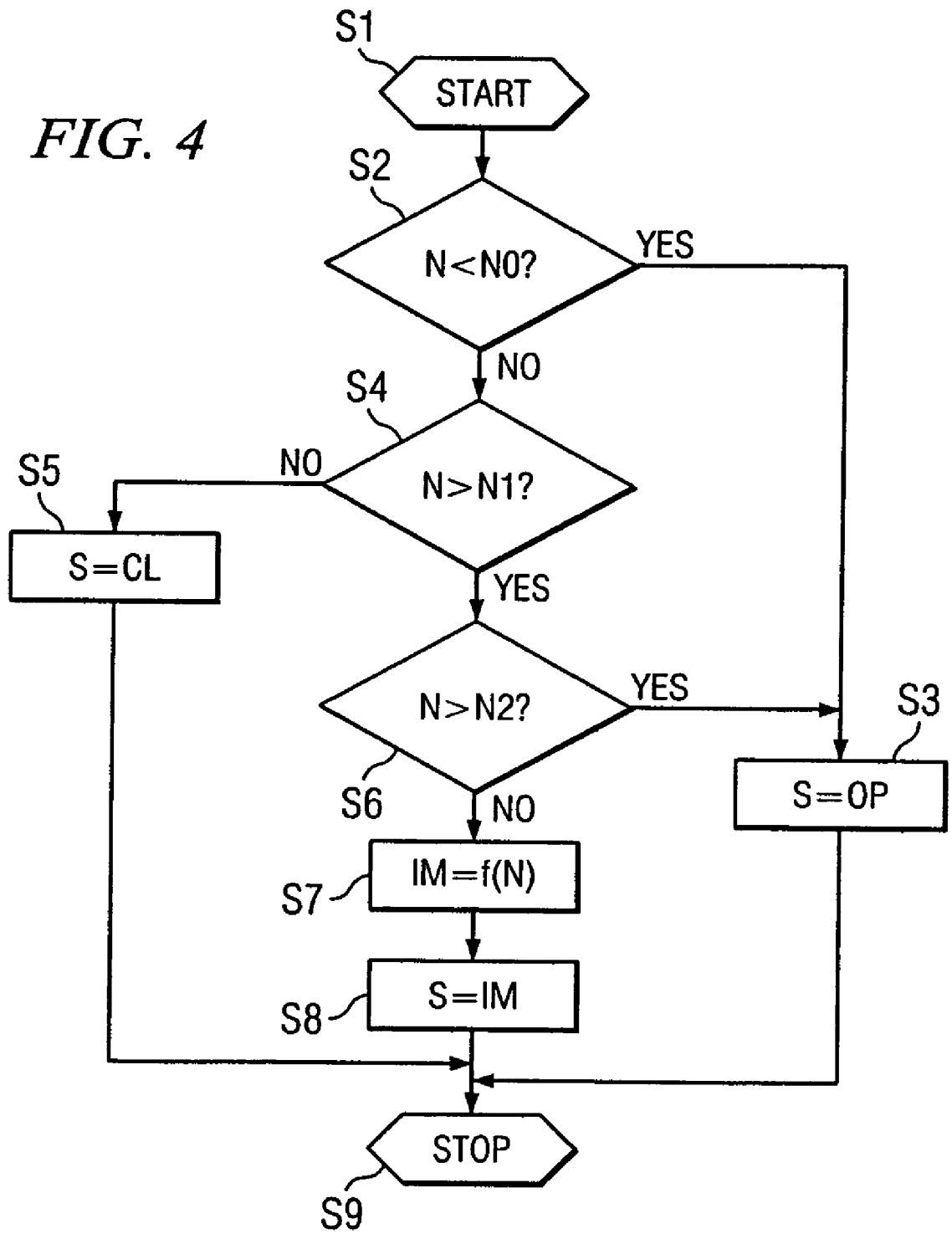

According to FIG. 4, a program for controlling the internal combustion engine is started in a step S1. A step S2 tests whether or not the speed N is less than a third threshold value N0. If this is the case, the position S of switching flaps 20 to 22 is moved to an open position OP in a step S3. In the open position OP, each of the switching flaps 20 to 22 open the openings to the neighboring intake pipes 5 to 8 in which case the effective intake pipe length is shortened to the length of the intake pipe between the specific opening, in which the switching flaps 20 to 22 are arranged through to the intakes 11 to 14 on the engine block. The third threshold value N0 is selected advantageously in a range of 900 to 1500 rpm, for example at 1000 rpm. Tests on engine test stands showed that for such low speeds, charging the cylinders can be improved by a shorter effective intake pipe length.

However, if the condition of step S2 has not been fulfilled, a test will be performed in a step S4 as to whether or not the speed N exceeds a first threshold value. Should this not be the case, the positions S of the switching flaps 20 to 22 are moved to a closed state CL in a step S5. In the closed state CL, the intake pipes 5 to 8 do not communicate with the hollow body that in each case conforms to the neighboring intake pipe in this embodiment. Therefore, the openings in which the switching flaps 20 to 22 are arranged are closed. This results in an effective intake pipe length that conforms to the entire length of the intake pipe from the first manifold 4 through to the intakes 11 to 14. The first threshold value is preferably selected in a range from 2800 to 4000 rpm for example at 3400 rpm. As a result, excellent charging of the cylinders can be guaranteed in the range between the third threshold value N0 and the first threshold value N1.

However, if the speed N in the step S4 exceeds the first threshold value N1, a step S6 tests whether or not the speed exceeds a second threshold value N2. The second threshold value N2 is preferably in the range from 4000 to 4800 rpm for example at 4200 rpm. Should the speed in the step S6 be less than the second threshold value N2, a leakage position IM is determined as a function of the speed N in a step S7. In a particularly simple development, the leakage position IM is permanently specified. However, a further improvement of the torque curve can be achieved if the leakage position is variable and can be determined as a function of the speed. A particularly good torque curve is obtained if the leakage position IM is dimensioned in such a way that the leakage increases with an increasing speed N. In the leakage position, the openings are only opened slightly by the switching flaps 20 to 22 so that the air flow in this range of the intake pipes does not completely break away. In the leakage position IM, the openings are only opened to such an extent by the switching flaps 20 to 22 that this opening conforms to a maximum leakage of 15% of the opening area that can be closed by the specific switching flap.

In a step S8, the position S of the switching flap is then controlled in the leakage state. As a result, in the speed range between the first threshold value N1 and the second threshold value N2, the charging and therefore the torque of the cylinder of the internal combustion engine is clearly obtained. The switching flaps are then preferably embodied sealing tightly as described on the basis of the switching flap according to FIG. 3 and then in the speed range between the third threshold value N0 and the first threshold value N1 close the openings very tightly with a leakage of less than approximately 1% of the flap area which is extremely advantageous in this speed range. On the other hand, in the speed range between the first speed threshold and the second speed threshold, the leakage position IM advantageously acts further on the torque curve.

However, if the condition of step S6 has been fulfilled, i.e. the speed exceeds the second threshold value N2, in one step S2 the position S of the switching flaps 20 to 22 in the step S3 is moved into the open position OP in which case the speeds exceeding the second threshold value N2 give a very good torque curve.

Advantageously, movement of the actuators into a leakage position also depends on a load variable of the internal combustion engine. In this way the leakage position is for example only selected in the area close to full load, i.e. for example if the intake pipe pressure approximately conforms to the environmental pressure at the specific speed.

We claim:

1. A method for controlling an internal combustion engine with an intake device, comprising intake pipes for intakes of cylinders of the internal combustion engine, one or more first actuators for adjusting an effective pipe length of at least one of the intake pipes by closing or opening at least one opening between neighboring intake pipes, and at least one second actuator for controlling the first actuators based at least on a speed of the engine, the method comprising the steps of:
    within a first speed range whose upper limit is a first threshold value, moving the first actuators into a closed position;
    for a speed exceeding the first threshold value but less than a second threshold value, moving the first actuators into a leakage position; and
    for a speed exceeding the second threshold value, moving the first actuators into an open position.

2. The method according to claim 1, further comprising, for speeds exceeding the first threshold value but less than the second threshold value, controlling the first actuators to adjust the leakage position based at least on the speed.

3. The method according to claim 2, wherein as the speed increases, the leakage is increased by controlling the first actuators.

4. The method according to claim 1, wherein movement of the first actuators into a leakage position is further dependant on a load size of the internal combustion engine.

5. The method according to claim 1, further comprising, for a speed less than a third threshold value that is less than the first threshold value, moving the first actuators into the open position.

6. The method according to claim 5, wherein the third threshold value is in the range from 900 to 1500 rpm.

7. The method according to claim 1, wherein the first threshold value is in the range from 2800 to 4000 rpm.

8. The method according to claim 1, wherein the second threshold value is in the range from 3400 to 4800 rpm.

9. A device for controlling an internal combustion engine with an intake device, comprising:
    intake pipes for intakes of cylinders of the internal combustion engine;
    one or more first actuators for adjusting an effective pipe length of at least one of the intake pipes by closing or opening at least one opening between neighboring intake pipes;
    at least one second actuator for controlling the first actuators based at least on a speed of the engine;
    first means that within a first speed range whose upper limit is a first threshold value, move the first actuators into a closed position;
    second means that for a speed exceeding the first threshold value but less than a second threshold value, move the first actuators into a leakage position; and
    third means that for a speed exceeding the second threshold value, move the first actuators into an open position.

10. A device for controlling an internal combustion engine with an intake device, comprising:
    intake pipes coupled with intakes of cylinders of the internal combustion engine;
    one or more first actuators for adjusting an effective pipe length at least one of the intake pipes by closing or opening at least one opening between neighboring intake pipes;
    at least one second actuator for controlling the first actuators; and
    a control unit for controlling the second actuator based at least on a speed of the engine; wherein
    within a first speed range whose upper limit is a first threshold value, the control unit controls the second actuator to move the first actuators into a closed position;
    for a speed exceeding the first threshold value but less than a second threshold value, the control unit controls the second actuator to move the first actuators into a leakage position; and
    for a speed exceeding the second threshold value, the control unit controls the second actuator to move the first actuators into an open position.

11. The device according to claim 10, wherein for speeds exceeding the first threshold value but less than the second threshold value, the control unit controls the leakage position based at least on the speed.

12. The device according to claim 11, wherein the control unit increases the leakage as the speed increases.

13. The device according to claim 10, wherein the control unit controls the movement of the first actuators into a leakage position based both on the speed and on a load size of the internal combustion engine.

14. The device according to claim 10, wherein for a speed less than a third threshold value that is less than the first threshold value, the control unit controls the second actuator to move the first actuators into the open position.

15. The device according to claim 14, wherein the third threshold value is in the range from 900 to 1500 rpm.

16. The device according to claim 10, wherein the first threshold value is in the range from 2800 to 4000 rpm.

17. The device according to claim 10, wherein the second threshold value is in the range from 3400 to 4800 rpm.

18. The device according to claim 10, wherein the at least one second actuator comprises an electric motor.

19. The device according to claim 10, wherein the one or more first actuators comprise switching flaps.

20. A method for controlling an internal combustion engine comprising the steps of:
providing intake control means for controlling an effective pipe length of an intake pipe system by opening or closing at least one opening between neighboring intake pipes;
determining an engine speed;
within a first speed range whose upper limit is a first threshold value, closing the opening;
for a speed exceeding the first threshold value but less than a second threshold value, controlling said opening to allow a leakage; and
for a speed exceeding the second threshold value, opening said opening.

21. The method according to claim 20, further comprising, for speeds exceeding the first threshold value but less than the second threshold value, adjusting the leakage based at least on the speed.

22. The method according to claim 21, wherein as the speed increases, the leakage is increased.

23. The method according to claim 20, wherein movement of the first actuators into a leakage position is further dependant on a load size of the internal combustion engine.

24. The method according to claim 20, further comprising, for a speed less than a third threshold value that is less than the first threshold value, opening the opening.

25. The method according to claim 24, wherein the third threshold value is in the range from 900 to 1500 rpm.

26. The method according to claim 20, wherein the first threshold value is in the range from 2800 to 4000 rpm.

27. The method according to claim 20, wherein the second threshold value is in the range from 3400 to 4800 rpm.

* * * * *